J. S. ZELAYA.
CORN AND CALLOUS REMOVER.
APPLICATION FILED JUNE 15, 1918.

1,335,777.

Patented Apr. 6, 1920.

Inventor:
José Santos Zelaya
by A. P. Greeley, Attorney.

UNITED STATES PATENT OFFICE.

JOSÉ SANTOS ZELAYA, OF NEW YORK, N. Y.

CORN AND CALLOUS REMOVER.

1,335,777.	Specification of Letters Patent.	Patented Apr. 6, 1920.

Application filed June 15, 1918. Serial No. 240,127.

*To all whom it may concern:*

Be it known that I, José Santos Zelaya, a citizen of the Republic of Nicaragua, residing at New York, in the county of New York, State of New York, have invented certain new and useful Improvements in Corn and Callous Removers, of which the following is a description, reference being had to the accompanying drawings, forming a part hereof.

My invention relates to corn and callous removers and has for its object to provide a simple and inexpensive device which will be effective to quickly and painlessly remove the hardened surface of a corn or callous and will be particularly adapted to effectively operate on corns or callouses between the toes or fingers.

With these and other objects hereinafter explained in view my invention consists in the construction and combination of elements hereinafter described and claimed.

Referring to the drawings Figure 1 is a top plan view of a corn and callous remover embodying my invention.

Figure 1:
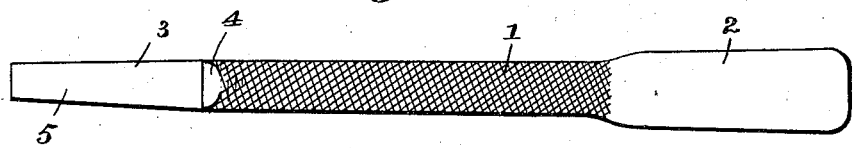
Figure 2:
Fig. 2 is a side view of the same.

In the drawings, 1 indicates the main portion or body of the corn and callous remover. 2 indicates the handle and 3 indicates a flattened end extension.

Figures 4, 5:
Fig. 4 is a cross sectional view on line 4—4 of Fig. 2.
Fig. 5 is a cross sectinal view on line 5—5 of Fig. 2.
Figure 3:
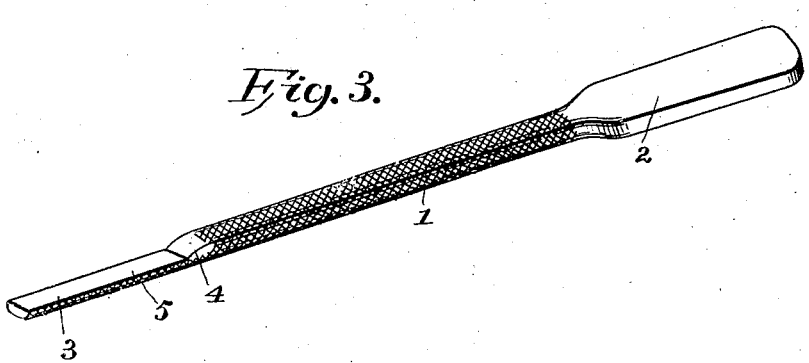
Fig. 3 is a perspective view of the same.
Figures 6, 7:
Fig. 6 is a cross sectional view corresponding to Fig. 4, but showing a modified form
Fig. 7 is a cross sectional view corresponding to Fig. 5, but showing the modified form.

The main portion or body 1 is preferably oval in cross section as shown in Fig. 5, but may be round in cross section as shown in Fig. 7. The handle 2 is broad relative to the main portion or body 2 so as to be readily grasped by the fingers of the user and is made with smooth surfaces and rounded edges and end. The main portion or body 1 is suitably roughened to present throughout a surface adapted to serve as a file. At its end opposite the handle 2 this main body portion on its upper side slopes in a gradual curve 4 to the upper surface 5 of the end extension 3 which is flat and preferably tapers somewhat to its end. When the extension 3 is inserted between the toes, the smooth curved surface 4 acts as a stop, which causes no abrasion of the skin with which it contacts. The under surface of the end extension 3 is roughened to present a surface adapted to serve as a file.

The corn and callous remover may be made of steel or other metal such, for instance, as aluminum and may be solid or hollow and may if desired be formed of sheet metal bent to shape. If made of sheet metal the roughened surface may be readily and inexpensively made by punching small holes through from the inner surface outward in the same way that the ordinary kitchen nutmeg grater is formed.

In use the roughened surface of the main portion or body 1 serves effectively to remove by abrasion the hard surface of a corn or callous on the bottom of the foot or on the outer surface of the toes and the end extension 3 is particularly adapted to be used to remove corns or callous between toes, the roughened under surface being used on the corn or callous, the flat upper surface 5 of this extension being adapted to move smoothly against the surface of the next adjacent toe without danger of injury to the skin.

The corn and callous remover will ordinarily be made from six to seven inches in length with a width in the body, portion which may be made tapering from the handle to the extension 3, of from five sixteenths or three eighths of an inch and a thickness of three sixteenths though these dimensions may be varied.

The corn and callous remover usually bears the name, Zelaya Corn E z E stamped or otherwise marked on the handle 2.

The device is simple and inexpensive to make and is highly efficient in use and can be readily carried in the pocket or in a kit bag.

Having thus described my invention what I claim is:

1. A corn or callous remover comprising a body portion having its surface roughened to serve as a file, a handle at one end of the body portion and an extension at the other end thereof, the extension being of substantially less thickness than the body portion and having one surface roughened to serve as a file and the other surface smooth.

2. A corn or callous remover comprising a body portion having rounded edges and having its surface roughened to serve as a file, a handle at one end of the body portion and an extension at the other end thereof, the extension being of substantially less thickness than the body portion and having one surface roughened to serve as a file and the other surface smooth.

3. A corn or callous remover comprising a body portion having its entire surface roughened to serve as a file, a handle at one end of the body portion and an extension at the other end thereof, the extension being of substantially less thickness than the body portion and having one surface roughened to serve as a file and the other surface smooth.

4. A corn or callous remover comprising a body portion having rounded edges and having its entire surface roughened to serve as a file, a handle at one end of the body portion and an extension at the other end thereof, the extension being of substantially less thickness than the body portion and having one surface roughened to serve as a file and the other surface smooth.

5. A corn or callous remover comprising a body portion having rounded edges and having its surface roughened to serve as a file, a handle at one end of the body portion and an extension at the other end thereof of substantially less thickness than the body portion, having a flat smooth upper surface and having its under surface roughened to serve as a file, the upper part of the body portion terminating in a smooth inclined shoulder leading to the smooth upper surface of the extension.

6. A corn and callous remover comprising a body portion having rounded edges and having its surface roughened to serve as a file, a handle at one end of the body portion and an extension at the other end of the body portion of substantially less thickness than the body portion, having a flat smooth upper surface and having its under surface roughened to serve as a file, the roughened surface of the extension being continuous with the roughened surface of the body portion, the upper portion of the body portion terminating in a smooth inclined shoulder leading to the smooth upper surface of the extension.

In testimony whereof I affix my signature this 12th day of June, 1918.

JOSÉ SANTOS ZELAYA.